(12) United States Patent
Park et al.

(10) Patent No.: US 12,362,108 B2
(45) Date of Patent: Jul. 15, 2025

(54) CAPACITOR PROCESSING APPARATUS

(71) Applicant: Samwha Electric Co., Ltd., Cheongju-si (KR)

(72) Inventors: Jong On Park, Cheongju-si (KR); Tae Yun Kim, Sejong-si (KR); Eun Kyun Joo, Cheongju-si (KR); Young Jin Kwon, Cheongju-si (KR); Jang Yong Yoon, Cheongju-si (KR); Ji Heon Choi, Cheongju-si (KR); Long Ji Li, Cheongju-si (KR)

(73) Assignee: Samwha Electric Co. Ltd., Cheongju-si (KR)

( * ) Notice: Subject to any disclaimer, the term of this patent is extended or adjusted under 35 U.S.C. 154(b) by 502 days.

(21) Appl. No.: 17/765,053

(22) PCT Filed: Jun. 15, 2021

(86) PCT No.: PCT/KR2021/007505
§ 371 (c)(1),
(2) Date: Mar. 30, 2022

(87) PCT Pub. No.: WO2022/035036
PCT Pub. Date: Feb. 17, 2022

(65) Prior Publication Data
US 2022/0392715 A1 Dec. 8, 2022

(30) Foreign Application Priority Data
Aug. 14, 2020 (KR) .................. 10-2020-0102270

(51) Int. Cl.
*H01G 13/00* (2013.01)
*H01G 9/00* (2006.01)
(Continued)

(52) U.S. Cl.
CPC ........... *H01G 13/06* (2013.01); *H01G 9/0029* (2013.01); *H01G 13/00* (2013.01); *H01G 13/006* (2013.01);
(Continued)

(58) Field of Classification Search
CPC ...... H01G 13/00; H01G 13/06; H01G 9/0029; H01G 9/06; H01G 9/008; H01G 2/04;
(Continued)

(56) References Cited

U.S. PATENT DOCUMENTS 4,953,283 A * 9/1990 Kawabata ......... Y10T 29/53261
29/559

FOREIGN PATENT DOCUMENTS

CN         1841607 A      10/2006
DE    202011000854 U1      7/2012
(Continued)

OTHER PUBLICATIONS

Wilke et al., "Fabrication of Solid-State Multilayer Glass Capacitors," in IEEE Transactions on Components, Packaging and Manufacturing Technology, vol. 7, No. 11, pp. 1906-1910, Nov. 2017. (Year: 2017).*

(Continued)

*Primary Examiner* — A. Dexter Tugbang
(74) *Attorney, Agent, or Firm* — Sisson & Banyas, Attorneys at Law, LLC; Edwin A. Sisson

(57) ABSTRACT

An capacitor processing apparatus, and a method for processing a capacitor, may include a clamping module grabbing or releasing a capacitor to transport the capacitor, and processing modules matched with each other to process and test leads of the capacitor, and simultaneously perform various processes through different processing units formed in the processing modules. These various processes may include separating, bending, and cutting the leads of the (Continued)

capacitor. The testing and processing provided by the current invention make it is possible to process a larger amount of capacitors assembled to a capacitor assembly, and to identify and remove defective capacitors before assembly.

12 Claims, 8 Drawing Sheets

(51) Int. Cl.
*H01G 9/06* (2006.01)
*H01G 13/06* (2006.01)
*H01G 2/04* (2006.01)
*H01G 2/10* (2006.01)
*H01G 9/008* (2006.01)

(52) U.S. Cl.
CPC ............... *H01G 2/04* (2013.01); *H01G 2/106* (2013.01); *H01G 9/008* (2013.01); *H01G 9/06* (2013.01)

(58) Field of Classification Search
CPC ............... H01G 2/106; H01G 13/006; Y10T 29/53174; Y10T 29/53183; Y10T 29/53187; Y10T 29/53191; Y10T 29/53261
See application file for complete search history.

(56) References Cited

FOREIGN PATENT DOCUMENTS

| | | | |
|---|---|---|---|
| EP | 2727185 | A1 | 5/2014 |
| JP | S57092824 | A | 6/1982 |
| JP | H5326349 | A | 12/1993 |
| JP | 10-022182 | A | 1/1998 |
| JP | 2703718 | B2 | 1/1998 |
| JP | 2000277399 | A | 10/2000 |
| JP | 2003045749 | A | 2/2003 |
| JP | 2013023246 | A * | 2/2013 |
| KR | 10-2002-0054972 | A | 7/2002 |
| KR | 10-2003-0017292 | A | 3/2003 |
| KR | 10-0909030 | B1 | 7/2009 |

OTHER PUBLICATIONS

Europen Patent Office, European Partial Search Report, EP-21133896, Munich Germany.

Beijing Mingshuo Intellectual Property Agency, Office Action No. 2024013002688500, Jan. 30, 2024, Beijing China.

Kitahara KO, Office Action, Japanese Patent Application No. 2022-518887, Mar. 13, 2023, Japan.

* cited by examiner

[FIG. 4]
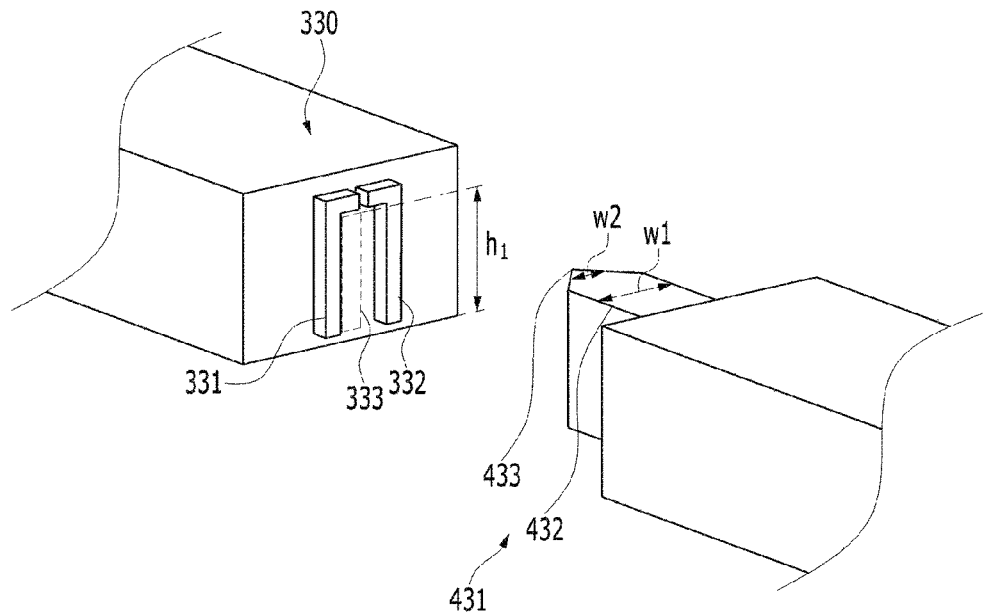
[FIG. 5]
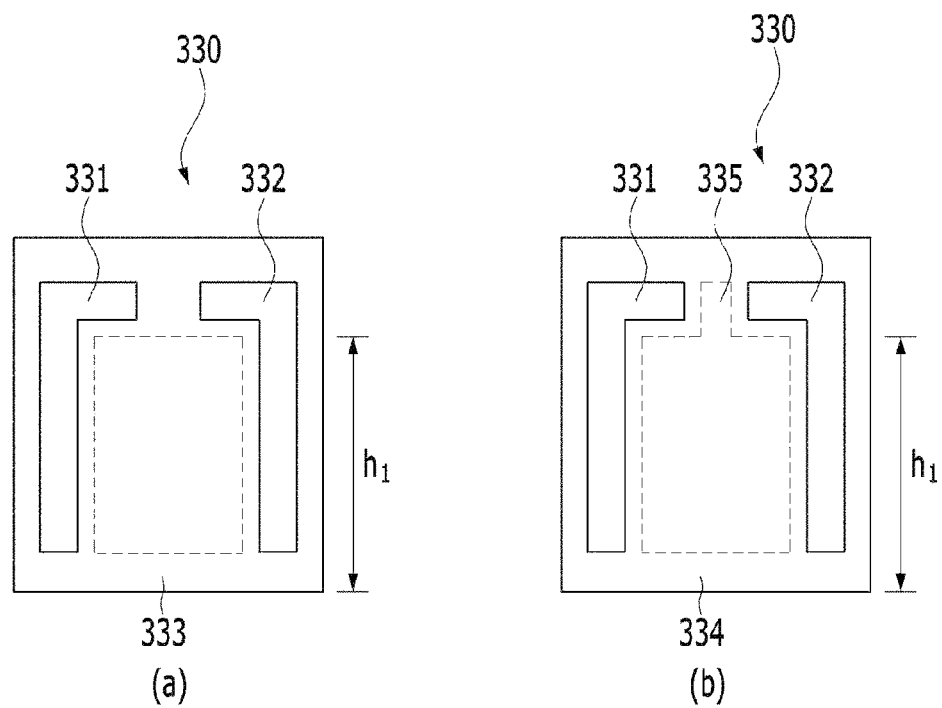

[FIG. 6]
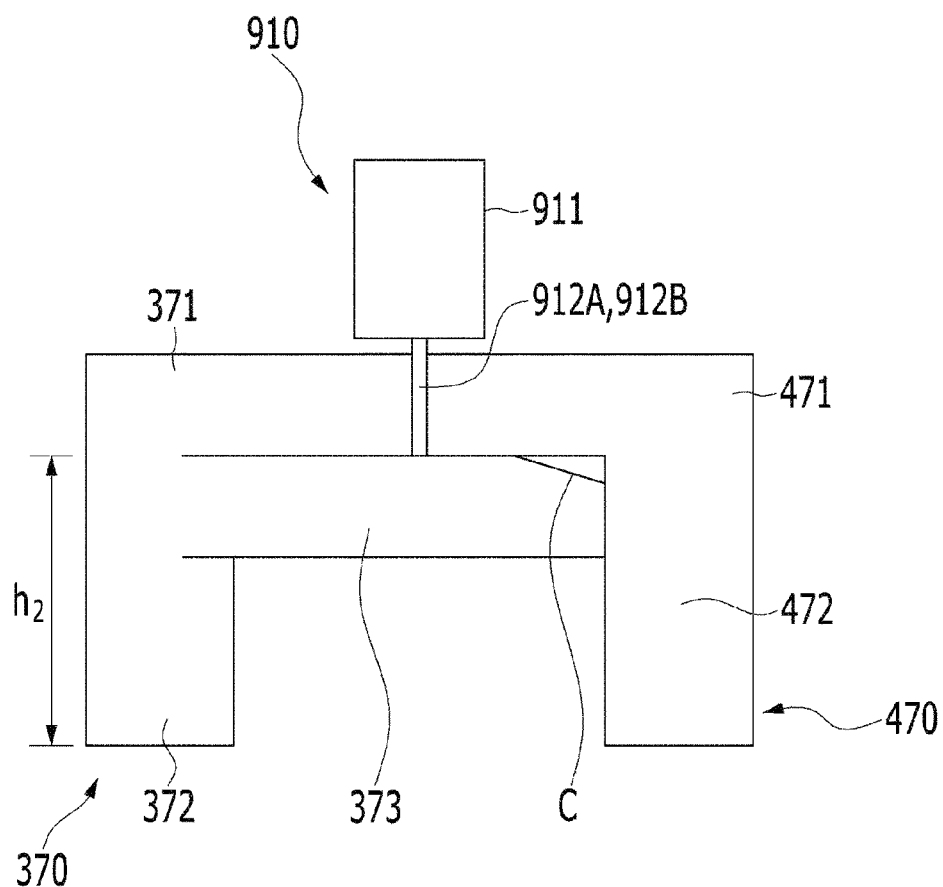

[FIG. 7]
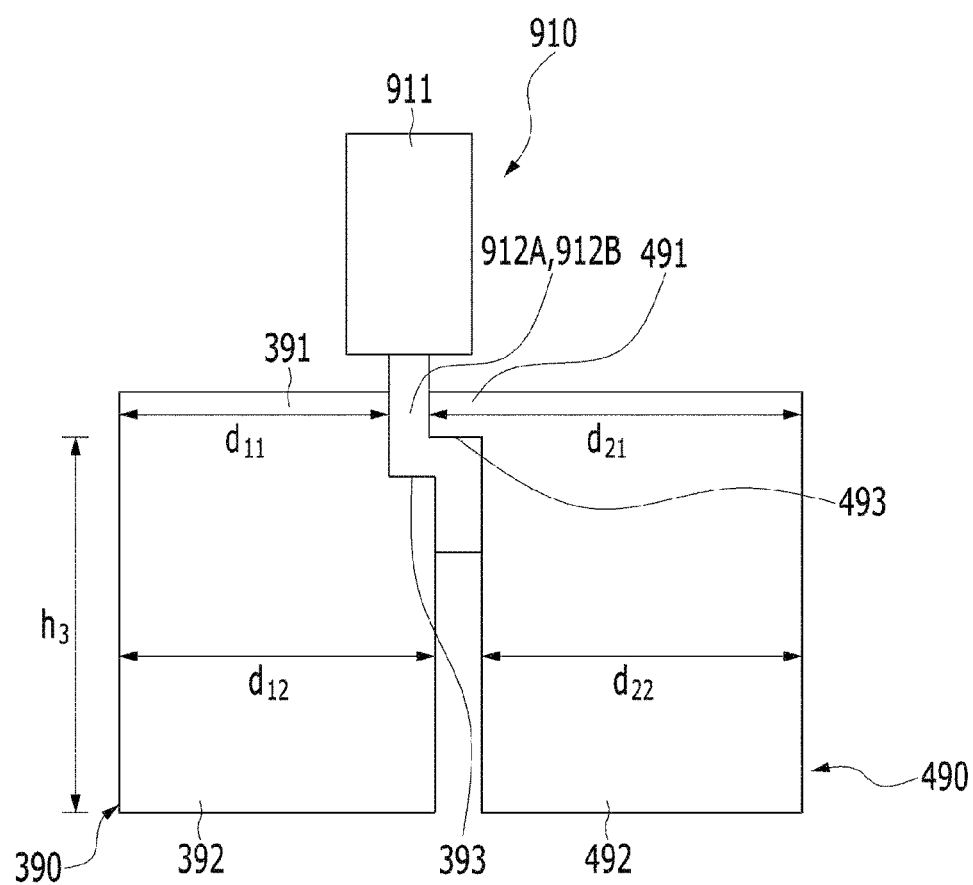

[FIG. 8]
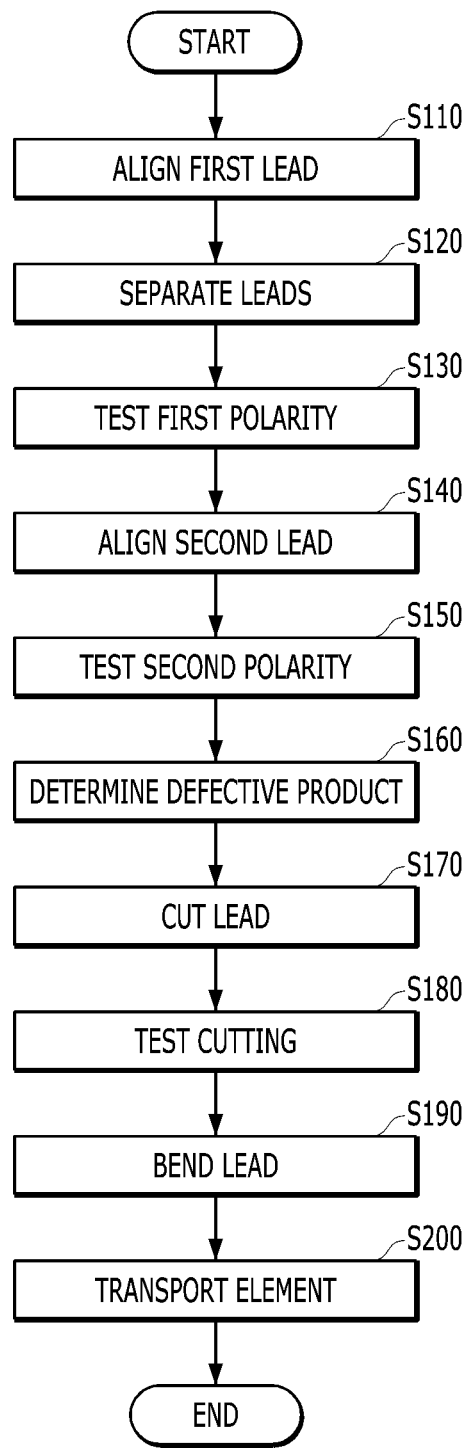

[FIG. 9]
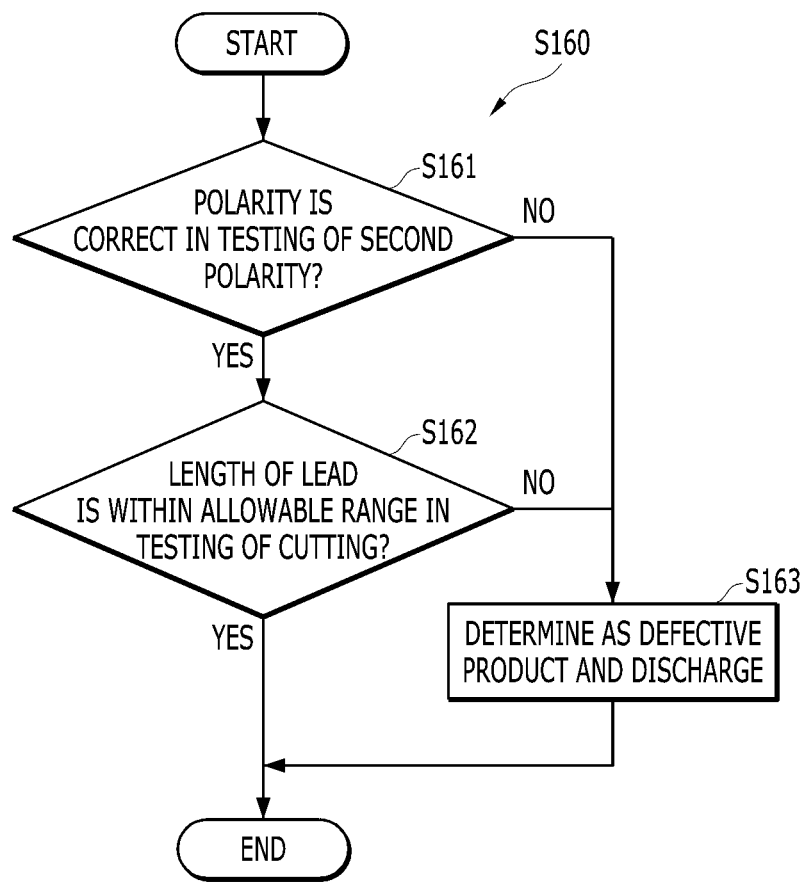

US 12,362,108 B2

CAPACITOR PROCESSING APPARATUS

PRIORITIES AND CROSS REFERENCES

This application claims priority from International Application No. PCT/KR2021/007505 filed on 15 Jun. 2021 and Republic of Korea Application No. 10 2020-0102270 filed on 14 Aug. 2020, the teachings of each of which are incorporated by reference herein in their entirety.

TECHNICAL FIELD

The present disclosure relates to an apparatus for processing a capacitor and a method for processing the capacitor.

BACKGROUND ART

A capacitor is a device that temporarily stores electricity in an electronic circuit, and is referred to as a condenser. In general, a capacitor has a structure in which a dielectric with insulating property is formed between two conductor electrodes, and serves to suppress a sudden rise or drop in voltage by storing energy by inducing a (−) charge in one electrode and a (+) charge in the other electrode when a voltage is applied between the two electrodes of the capacitor and charging or discharging the charges by using this energy storage principle. Due to this role of the capacitor, the capacitor is one of the essential elements in constituting the electronic circuit.

Meanwhile, the capacitor may have a capacitor main body having different charges induced and having a dielectric, and a pair of leads connected to each conductor electrode and coupled to the electronic circuit to flow a current. Conventionally, the lead is directly bonded to a circuit board through soldering, etc., but in this case, there is a disadvantage in that the lead occupies many heights in the planar direction of the circuit board and therefore, a space in which the circuit board is arranged is not efficiently utilized. In addition, if the lead is arranged to be bent to reduce the height, a bent portion is broken and therefore, the capacitor may be separated from the circuit board, and there is a risk of causing the defect of the electronic device.

Therefore, to solve this problem, a method for constituting an assembly by cutting the leads of the capacitor to couple them to a bracket has been attempted. To constitute this assembly, there is a continuing need in the industry for the equipment and method for processing a capacitor having a uniform shape and testing whether the processed capacitor is electrically normal.

SUMMARY OF INVENTION

Technical Problem

To solve the above problem, an object of the present disclosure is to provide an apparatus for processing a capacitor, which grabs or releases a plurality of capacitors at the same time, and performs different processing processes at the same time.

In addition, another object of the present disclosure is to provide a method for processing a capacitor, which processes a plurality of capacitors at the same time, and processes and tests the capacitor in a regular order.

The objects of the present disclosure are not limited to the aforementioned objects, and other objects not mentioned may be understood to those skilled in the art from the following descriptions.

Solution to Problem

An apparatus for processing a capacitor including a main body and a pair of leads formed to protrude from the main body includes: a clamping module transporting the capacitor and including clamping units grabbing or releasing each capacitor, a first processing module having some of the capacitors transported by the clamping module seated thereon, and a second processing module moved toward the first processing module in the state where some of the capacitors are seated on the first processing module and matched with the first processing module, in which the first processing module may include a plurality of processing units on which each capacitor is seated and arranged in order, the second processing module may include symmetrical processing units matched with the processing units, respectively, and the processing units may be formed in different shapes.

In addition, any one of the clamping units may seat the capacitor on any one of the processing units in the state of grabbing the capacitor, and then release the capacitor when the processing unit and the symmetrical processing unit are matched, and move toward the previous processing unit.

In addition, the clamping module may be (1) moved in a first direction when the clamping unit seats the capacitor on an Nth processing unit of the first processing module, (2) moved in a direction opposite to the first direction when the clamping unit releases the capacitor in the state where the processing unit and the symmetrical processing unit are matched, and then moved in a second direction perpendicular to the first direction, and therefore, the clamping units may be moved toward an (N−1)th processing unit, and (3) when the clamping unit is moved in the first direction and then grabs the capacitor seated on the (N−1)th processing unit, the matching between the first processing module and the second processing module may be released.

In addition, the clamping module may be (4) moved in the direction opposite to the first direction in the state where the matching between the first processing module and the second processing module are released to remove the capacitor grabbed by the clamping unit from the (N−1)th processing unit, and then move in the direction opposite to the second direction to move the capacitor toward the Nth processing unit.

In addition, the processing unit may include an alignment unit rotating the capacitor in one direction and having an alignment groove for seating the leads of the capacitor in the processing unit formed therein, an expansion unit including a pair of frames formed symmetrically to mold the leads of the capacitor in a regular form, a polarity test unit detecting the polarity of the lead of the aligned capacitor, a cutting unit cutting the leads of the capacitor at the same length, a cutting test unit testing the cut quality of the lead cut by the cutting unit, and a bending unit including a first step part having a first thickness and a second step part having a second thickness formed to pressurize the cut leads of the capacitor in a third direction perpendicular to the first direction and the second direction to bend the cut leads of the capacitor in one direction.

In addition, the symmetrical processing unit may include a symmetrical expansion unit formed to be matched with the expansion unit, inserted between the leads to separate the leads of the capacitor, and including an expansion block having a first height, a symmetrical cutting unit formed to be matched with the cutting unit and cutting the leads of the capacitor, and a symmetrical bending unit formed to be matched with the bending unit and including a symmetrical first step part having a third thickness to correspond to the first step part and a symmetrical second step part having a fourth thickness to correspond to the second step part.

In addition, the expansion block may have a shape whose width is reduced in the third direction.

In addition, at least one of the cutting unit and the symmetrical cutting unit may include a cutting block having a cut surface formed to be inclined to cut the leads of the capacitor and having a second height, and the cutting block may be formed without a gap with the cutting unit and the symmetrical cutting unit.

In addition, the second height may be formed to be higher than the first height.

In addition, the bending unit may further include a bending part connecting the first step part to the second step part between the first step part and the second step part, the symmetrical bending unit may further include a symmetrical bending part connecting the symmetrical first step part to the symmetrical second step part between the symmetrical first step part and the symmetrical second step part, and the first processing module and the second processing module may be matched so that intervals between the first step part and the symmetrical first step part, between the second step part and the symmetrical second step part, and between the bending part and the symmetrical bending part are equally formed.

In addition, at least one of the cutting unit and the symmetrical cutting unit may include a cutting block having the cut surface formed to be inclined to cut the leads of the capacitor and having a second height, and the bending unit may have one end of the bending part connected to the first step part and the one end of the bending part formed at a third height of the bending unit, and the third height may be formed to be higher than the second height.

In addition, the first thickness of the first step part may be formed to be smaller than the third thickness of the symmetrical first step part, the second thickness of the second step part may be formed to be larger than the fourth thickness of the symmetrical second step part, and the first thickness of the first step part may be formed to be smaller than the second thickness of the second step part.

In addition, the cutting test unit may include a light sensor part configured to accommodate specific light to test a cut length of the lead.

In addition, the apparatus for processing the capacitor may further include a transport unit configured to collect the capacitor processed by matching the first processing module with the second processing module, in which the transport unit may include a fixing part supported to be fixed to one surface thereof, and a rotation part coupled to one surface of the fixing part and rotating within an angle range of a straight angle or less on a plane including a first direction in which the clamping module moves to transport the capacitor and a second direction perpendicular to the first direction, and the rotation part may further include a pair of transport arms grabbing the main body of the capacitor at one point to release it at another point.

Meanwhile, a method for processing a capacitor including a main body and a pair of leads formed to protrude from the main body according to the present disclosure may include cutting the leads of the capacitor at a regular length, and bending the leads of the capacitor cut in the cutting in one direction.

In addition, the method may further include separating the leads of the capacitor at a first height before cutting the leads of the capacitor, testing the polarity of each of the separated leads of the capacitor after the separating of the leads, testing the cutting that determines cut lengths of the leads depending upon whether reflected light is introduced due to the radiation of light to test the cut quality of the leads cut by performing the cutting after the testing of the polarity, and determining a defective product that determines whether the capacitor is defective from the testing of the polarity and classifies the defective product.

In addition, the separating of the leads may be performed by an expansion block having a first height and having a width gradually reduced in one direction to separate the leads from each other, the cutting may be performed by a cutting block having a second height higher than the first height and having a cut surface to cut the leads, and the bending may be performed by a bending part having a third height higher than the second height to bend the leads in one direction.

In addition, the bending may be performed by a first processing module formed with a bending unit including a first step part having a first thickness and a second step part having a second thickness larger than the first thickness to perform the bending, and a second processing module formed with a symmetrical bending unit including a symmetrical first step part having a third thickness and a symmetrical second step part having a fourth thickness smaller than the third thickness to perform the bending, and the first thickness may be smaller than the third thickness, and an interval when the bending unit and the symmetrical bending unit are matched may be regularly formed.

In addition, the cutting, the bending, the separating of the leads, the testing of the polarity, the determining of the defective product, and the testing of the cutting may be performed by moving the clamping module grabbing or releasing the main body of the capacitor and matching the first processing module including the processing units for which the corresponding steps are performed to perform the respective steps with the second processing module including the symmetrical processing units matched with the processing units performing the steps.

In addition, the method may further include transporting that grabs a main body of a normal capacitor at one point to release it at another point to collect the normal capacitor after the determining of the defective product.

Advantageous Effects of Invention

By using the apparatus for processing the capacitor and the method for processing the capacitor according to the present disclosure, it is possible to process the capacitor so that the capacitor may be mounted on the circuit board in the form of the assembly to reduce the overall volume occupied by the circuit, thereby constituting the compact circuit through the assembly having the capacitor processed by the apparatus for processing the capacitor.

In addition, it is possible to automatically process the capacitor by grabbing or releasing the plurality of capacitors at once and to perform different processing processes at the same time.

In addition, it is possible to identify the defective product by testing whether there is defective in the processing process, thereby preventing the capacitor already determined as having the defect from being coupled to the assembly to prevent the defective assembly from being manufactured.

In addition, it is possible to accurately test the defect by double-testing the mechanical defect and the electrical defect in testing whether there is defective.

BRIEF DESCRIPTION OF DRAWINGS

FIG. 4 is an enlarged view of an expansion unit in the apparatus for processing the capacitor according to the present disclosure.

FIG. 5 is a front view for explaining various exemplary embodiments of the expansion unit in the apparatus for processing the capacitor according to the present disclosure.

FIG. 6 is a schematic one side view of a cutting unit in the apparatus for processing the capacitor according to the present disclosure.

FIG. 7 is a schematic one side view of a bending unit in the apparatus for processing the capacitor according to the present disclosure.

FIG. 8 is a flowchart of a method for processing a capacitor according to the present disclosure.

FIG. 9 is a flowchart for explaining a method for determining a defective product according to the processing of the capacitor in the method for processing the capacitor according to the present disclosure.

DESCRIPTION OF SYMBOLS

Figure 1:
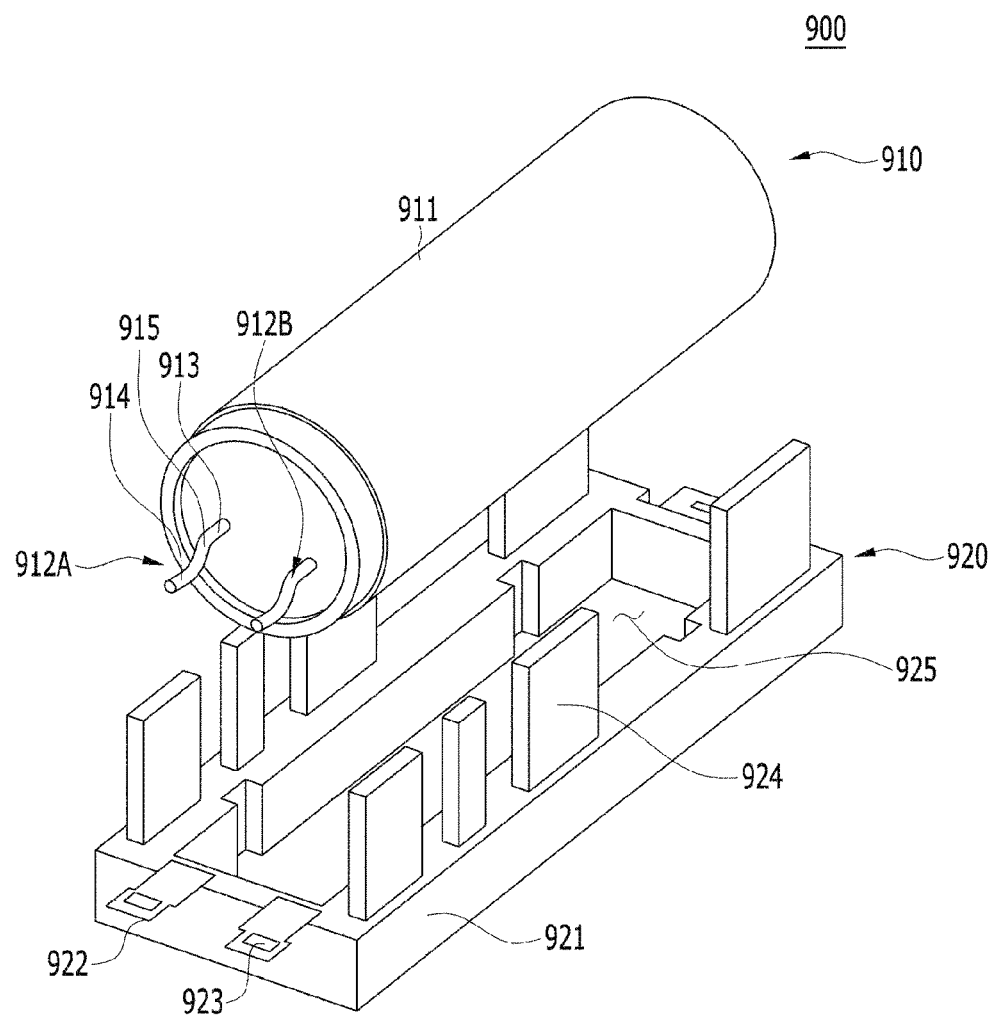
FIG. 1 is a perspective view of a capacitor assembly manufactured by an apparatus for processing a capacitor according to the present disclosure.

900: Capacitor assembly 910: Capacitor
911: Capacitor main body 912A, 912B: Lead
913: First lead region 914: Second lead region
915: Bending region 920: Bracket
921: Bracket base 922: First bracket electrode
923: Second bracket electrode 924: Accommodating partition wall
925: Slit
100: Apparatus for processing a capacitor 200: Clamping module
210: Clamping module main body 220: Clamping unit
300: First processing module 400: Second processing module
310: First processing module main body 320: First alignment unit
330: Expansion unit 340: First polarity test unit
350: Rotation unit 360: Second polarity test unit
370: Cutting unit 380: Cutting test unit
390: Bending unit A: Defective product classification region
321: Alignment groove 331, 332: Frame
333: Accommodating space 334: First accommodating space
335: Second accommodating space
341, 342: First test electrode 361, 362: Second test electrode
371: First cutting step part 372: Second cutting step part
373: Cutting block 381: Light sensor part
391: Bending block
410: Second processing module main body 421: Symmetrical alignment groove
431: Expansion block 461, 462: Symmetrical first test electrode
471: Symmetrical first cutting step part 472: Symmetrical second cutting step part
481: light radiation part 491: Symmetrical bending block
h1: First height h2: Second height
h3: Third height
w1: First width w2: Second width
d11: First thickness d12: Second thickness
d21: Third thickness d22: Fourth thickness
500: Transport unit 510: Fixing part
520: Rotation part 521, 522: Transport arm

DESCRIPTION OF EMBODIMENTS

Hereinafter, some exemplary embodiments of the present disclosure will be described in detail with reference to exemplary drawings. In adding reference numerals to the components of each drawing, it should be noted that the same components are denoted by the same reference numerals if possible even though they are shown in different drawings. In addition, in describing the exemplary embodiment of the present disclosure, if it is determined that a detailed description of a related known configuration or function interferes with the understanding of the exemplary embodiment of the present disclosure, the detailed description thereof will be omitted.

In describing the components according to the exemplary embodiment of the present disclosure, the terms such as first, second, A, B, (a), and (b) may be used. These terms are merely to distinguish the component from other components, and the natures, orders, or sequences of the corresponding components are not limited by the terms. In addition, unless defined otherwise, all terms used herein, including technical or scientific terms, have the same meanings as generally understood by those skilled in the art to which the present disclosure pertains. The terms as defined in the dictionaries used commonly should be interpreted as having the meanings consistent with the contextual meanings of the relevant technology, and unless clearly defined otherwise in the present application, are not interpreted as ideally or excessively formal meanings.

Meanwhile, in the description of the present disclosure, the term 'symmetry' means that the shapes of both sides are the same around the axis in a dictionary sense, but may not necessarily be interpreted as such a meaning in the present specification, and is preferably interpreted as having the form or shape 'corresponding' to the form or shape of one side.

FIG. 1 is a perspective view of a capacitor assembly manufactured by an apparatus for processing a capacitor according to the present disclosure.

FIG. 1 shows a capacitor assembly 900 to be assembled by an apparatus for processing a capacitor according to the present disclosure. The capacitor assembly 900 may include a capacitor 910 including a main body 911 and a pair of leads 912A, 912B formed to protrude from the main body 911. At this time, the capacitor 910 may be an electrolytic capacitor, and the main body 911 may have a cylindrical shape.

A pair of leads 912A, 912B having a regular interval may be formed on one surface of the main body 911 of the capacitor to extend and protrude from the main body 911. FIG. 1 shows that the pair of leads 912A, 912B have the same length, but this indicates that the capacitor 910 is completely processed, and before the capacitor 910 is processed, the length of any one (e.g., 912A) of the pair of leads 912A, 912B may be formed to be shorter than the length of the other one (e.g., 912B). However, the leads 912A, 912B may be cut to have the same length by the apparatus for processing the capacitor according to the present disclosure, which will be described later.

To assemble to the capacitor assembly 900, the capacitor assembly 900 may further include a bracket 920 having the capacitor 910 fitted and coupled to electrically connect the capacitor 910 to a circuit board (not shown). The bracket 920 has a planar base 921, and electrodes 922, 923 for being bonded to the pair of leads 912A, 912B are formed on one surface (more specifically, an upper surface) of the base 921. The electrodes 922, 923 may be formed side by side to correspond to positions where the leads 912A, 912B are seated, and electrically connect the capacitor 910 to the circuit board so that the capacitor 910 is electrically conducted. The leads 912A, 912B and the electrodes 922, 923 may be bonded through soldering. In addition, the bracket 920 includes a pair of accommodating partition walls 924 formed to protrude from an upper surface of the base 921 to surround an outer surface of the main body 911 of the capacitor 910. The accommodating partition wall 924 enables the capacitor 910 to be stably seated on the bracket 920. The accommodating partition wall 924 may have a plurality of slits 925, and be pressurized so that the capacitor 910 may be stably seated on the bracket 920 through the slits 925.

Figure 2:
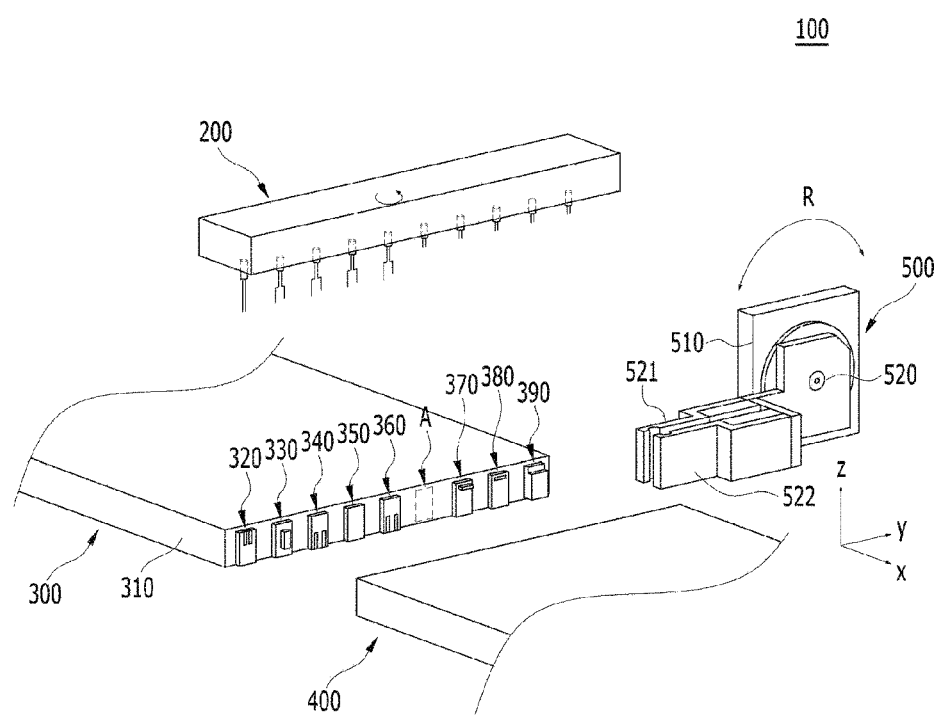
FIG. 2 is a schematic perspective view of the apparatus for processing the capacitor according to the present disclosure.
Figure 3:
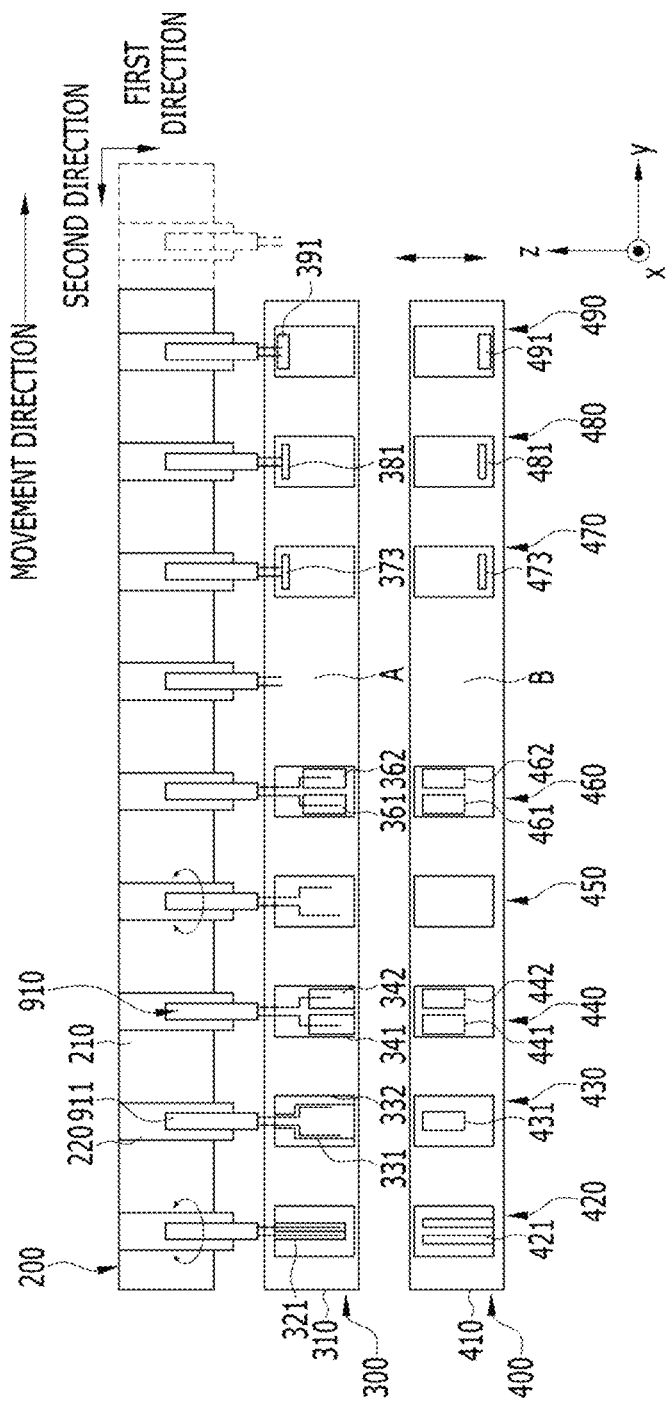
FIG. 3 is a view schematically showing a configuration of the apparatus for processing the capacitor according to the present disclosure.

FIG. 2 is a schematic perspective view of the apparatus for processing the capacitor according to the present disclosure, and FIG. 3 is a view schematically showing a configuration of the apparatus for processing the capacitor according to the present disclosure.

Referring to FIG. 2, an apparatus for processing a capacitor 100 according to the present disclosure may include a clamping module 200 transporting the capacitor 910 and including clamping units 220 grabbing or releasing each capacitor 910, a first processing module 300 having some of the capacitors 910 transported by the clamping module 200 seated thereon, and a second processing module 400 moved toward the first processing module 300 in the state where some of the capacitors 910 are seated on the first processing module 300 and matched with the first processing module 300.

The clamping module 200 may include a clamping module main body 210 and a plurality of clamping units 220 configured to grab or release the main body 911 of the capacitor 910. The clamping unit 220 may clamp and fix (i.e., grab) the capacitor 910 to surround an outer surface of the capacitor main body 911, and conversely, unfix and release the capacitor 910. The clamping unit 220 may be formed at regular intervals in one direction of the clamping module main body 210. More specifically, the clamping unit 220 may be formed to simultaneously grab or release 10 capacitors at once in one row, and the interval between the clamping units 220 may be an interval corresponding to an interval between processing units formed on the first processing module 300 and symmetrical processing units formed on the second processing module 400 and matched with the processing units of the first processing module 300, which will be described later.

Hereinafter, a process of transporting the capacitor 910 according to the operation of the clamping module 200 will be described.

Referring to FIG. 3, any one of the clamping units 220 may seat the capacitor 910 on any one of processing units 320, 330, 340, 350, 360, 370, 380, 390 of the first processing module 300 in the state of grabbing the capacitor 910, and then release the capacitor 910 when the processing unit of the first processing module 300 and the symmetrical processing unit of the second processing module 400 are matched, and be moved toward a previous processing unit. In other words, with respect to the sequentially formed different processing units, the clamping module 200 moves and seats the capacitors 910 from the processing unit having each capacitor 910 seated thereon before being grabbed to an adjacent processing unit in the state of simultaneously grabbing the plurality of capacitors 910 by the clamping unit 220. At this time, when the clamping module 200 grabs the capacitors 910 and moves to a position of the adjacent processing unit, the second processing module 400 moves toward the first processing module 300 and a plurality of processing units formed on one surface of the first processing module 300 and a plurality of symmetrical processing units formed on one surface of the second processing unit 400 are matched to fix the lead 912A, 912B of the capacitors 910 not to be moved, and when the first processing module 300 and the second processing module 400 are matched, the clamping unit 220 may release the capacitor main body 911 and return back to the original position.

A movement mechanism of the aforementioned clamping module 200 will be described in more detail. The clamping module 200 is moved in a first direction when the clamping unit 220 seats the capacitor 910 on an Nth processing unit of the first processing module 300, moved in a direction opposite to the first direction when the clamping unit 220 releases the capacitor 910 in the state where the processing unit and the symmetrical processing unit are matched, and then moved in a second direction perpendicular to the first direction, and therefore, the clamping units 220 are moved toward an (N−1)th processing unit.

First, the clamping unit 220 is spaced apart from the first processing module 300 at a certain height interval in the state of grabbing the capacitor 910. The clamping module 200 is moved in the first direction so that the height interval with the first processing module 300 is reduced. The clamping module 200 may be moved in the first direction by a distance at which when the Nth processing unit of the first processing module 300 and an Nth symmetrical processing unit of the second processing module 400 are matched, some or all of the leads 912A, 912B of the capacitor 910 may be seated and fixed therebetween. The first direction may be a negative direction of z-axis indicated.

After the clamping module 200 is moved in the first direction, the second processing module 400 moves toward the first processing module 300, and therefore, the processing units of the first processing module 300 and the symmetrical processing units of the second processing module 400 may be matched. At this time, the first processing module 300 may be fixed, and the second processing module 400 may be moved and matched with the first processing module 300. When the processing units of the first processing module 300 and the symmetrical processing units of the second processing module 400 are matched, the capacitor 910 is seated and fixed between the first processing module 300 and the second processing module 400.

When the capacitor 910 is seated and fixed, the leads 912A, 912B of the capacitor are processed and tested by the plurality processing units formed on one surface of the first processing module 300 and the symmetrical processing units formed on one surface of the second processing module 400 and corresponding to the processing units, and the clamping module 200 moves toward the (N−1)th processing unit and symmetrical processing unit. At this time, more specifically, the movement of the clamping module 200 toward the (N−1)th processing unit and symmetrical processing unit means that the clamping module 200 releases the capacitor 910 and then moves in the direction opposite to the first direction to increase the height interval with the first processing module 300, and then moves by a certain distance in the second direction (more specifically, negative direction of y-axis) perpendicular to the first direction.

The clamping module 200 moved toward the (N−1)th processing unit and symmetrical processing unit may transport the capacitor 910 seated on the (N−1)th processing unit and symmetrical processing unit toward the Nth processing unit and symmetrical processing unit. For example, the clamping unit 220 is moved in the first direction, and then grabs the capacitor 910 seated on the (N−1)th processing unit, and the matching between the first processing module 300 and the second processing module 400 may be released. In the state where the matching between the first processing module 300 and the second processing module 400 is released, the clamping module 200 may be moved in the direction opposite to the first direction and the capacitor 910 grabbed by the clamping unit 220 may be removed from the (N−1)th processing unit, and then moved in the direction opposite to the second direction to move the capacitor 910 toward the Nth processing unit.

More specifically, the clamping module 200 moves in the first direction and the clamping unit 220 grabs the capacitor 910 seated on the (N−1)th processing unit, and then the second processing module 400 moves in the opposite direction of the first processing module 300 and the matching of the capacitor 910 is released. The direction in which the second processing module 400 moves to release the matching of the capacitor 910 may be a positive direction of x-axis. Thereafter, the clamping module 200 moves the capacitor 910 grabbed by the clamping unit 220 from the (N−1)th processing unit toward the Nth processing unit, and at this time, the clamping module 200 may move in the direction opposite to the second direction and then move in the first direction.

Meanwhile, the processing units formed on one surface of the first processing module 300 may have different shapes. These processing units are approximately formed for various processing or tests of the leads 912A, 912B of the capacitor 910. For example, the plurality of processing units may include a unit for widening the interval between the leads 912A, 912B, a unit for shortening the length of the leads 912A, 912B, and a unit for bending the leads 912A, 912B in one direction.

More specifically, the processing unit of the first processing module 300 may include an alignment unit 320 that rotates the capacitor in one direction to enable the leads 912A, 912B of the capacitor 910 to be aligned at a correct position. The alignment unit 320 may include an alignment groove 321 in which each of the leads 912A, 912B may be seated, and the alignment groove 321 may be engraved side by side at constant widths. If the capacitor 910 is not aligned at the correct position and rotated by a certain angle or more, it is not seated in the alignment groove 321, and in this case, the main body 911 of the capacitor may be rotated and aligned through a rotation unit (not shown) formed on the clamping unit 220. By rotating the main body 911 of the capacitor to align the leads 912A, 912B, processing and test processes to be performed subsequently may be smoothly performed.

FIG. 4 is an enlarged view of an expansion unit in the apparatus for processing the capacitor according to the present disclosure, and FIG. 5 is a front view for explaining various exemplary embodiments of the expansion unit in the apparatus for processing the capacitor according to the present disclosure.

Referring to FIGS. 2 to 5, an expansion unit 330 configured to mold the leads 912A, 912B of the capacitor 910 in a regular shape is formed at a position adjacent to the alignment unit 320. To mold the leads 912A, 912B in desired shapes, the expansion unit 330 may interact with a symmetrical expansion unit 430 matched with the expansion unit 330 among the symmetrical processing units of the second processing module 400. More specifically, the expansion unit 330 may include a pair of frames 331, 332 formed symmetrically on both side surfaces thereof. The frames 331, 332 prevent the leads 912A, 912B from departing from their intended molding ranges when the leads 912A, 912B are spaced apart from each other.

Referring to FIGS. 3 and 4, the symmetrical expansion unit 430 of the second processing module 400 may include an expansion block 431 inserted between the leads 912A, 912B to separate the leads 912A, 912B of the capacitor 910 and having a first height (h1). The expansion block 431 may have various shapes, but to separate the leads 912A, 912B, the expansion block 431 may have a shape whose width is reduced in a third direction. In other words, when the expansion block 431 is formed to protrude from one surface of the symmetrical expansion unit 430, a first width (w1) of a proximal end 432 of the expansion block 431 may be formed to be larger than a second width (w2) of a distal end 433 thereof. The distal end 433 of the expansion block 431 may be first inserted between the leads 912A, 912B by the matching between the first processing module 300 and the second processing module 400, and thereafter, the proximal end 432 of the expansion block 431 may be inserted and therefore, the distance between the leads 912A, 912B may be expanded to separate the leads 912A, 912B, and the leads 912A, 912B may be molded by the frames 331, 332 formed symmetrically on the expansion unit 330 in a 'ㅏ' shape that is a Hangeul consonant. As described above, the separation of the leads 912A, 912B is to minimize an electrical interference between the respective leads 912A, 912B when the polarity of the capacitor 910 is tested by a polarity test unit 440 to be described later.

FIG. 5 shows an example of two types of expansion units 330. Referring to (a) of FIG. 5, the expansion unit 330 may include an accommodating space 333 having a pair of frames 331, 332 symmetrically formed and at the same time, accommodating the expansion block 431 of the symmetrical expansion unit 430. A height of the accommodating space 333 may be the same as the first height (h1) of the expansion block 431, and a width of the accommodating space 333 may also be the same as the first width (w1) of the proximal end 432 of the expansion block 431. Referring to (b) of FIG. 5, the expansion unit 330 may have the pair of frames 331, 332 symmetrically formed as in (a) of FIG. 5, but may have a first accommodating space 334 and a second accommodating space 335 having different widths of the spaces in which the expansion block 431 is accommodated. At this time, the height and width of the first accommodating space 334 may be the same as the height (h1) and width (w1) of the accommodating space 333. Meanwhile, the second accommodating space 335 extending from an upper end of the first accommodating space 334 may be additionally formed, and the expansion block 431 may be formed to correspond to the shapes of the first accommodating space 334 and the second accommodating space 335. When the expansion block 431 having the shape accommodated in the accommodating spaces 334, 335 having the forms shown in (b) of FIG. 5 is used, there is an advantage in that it is possible to guide the shape in which the leads 912A, 912B are separated more precisely.

Referring to FIGS. 2 and 3, the first processing module 300 may include polarity test units 340, 360 configured to detect the polarity of the capacitor after the capacitor 910 is aligned and the leads 912A, 912B are completely separated and expanded. The polarity test units 340, 360 may test the polarity of the capacitor 910 through the electrodes 341, 342, 361, 362 formed side by side. If the polarity of the capacitor 910 is opposite to the intended polarity, the capacitor 910 may be rotated by 180° around the main body 911 of the capacitor 910 in the portion of the polarity rotation unit 350. This rotation may be performed by the same configuration as that of the rotation unit formed in the clamping unit 220 in the alignment unit 320. More specifically, a first polarity test unit 340 may test the polarity of the capacitor 910, and depending upon the polarity test result of the first polarity test unit 340, the rotation unit 350 may selectively rotate the capacitor 910, and after the capacitor 910 is rotated, the second polarity test unit 360 may perform the test that confirms whether the capacitor 910 has the intended polarity direction.

For example, it is assumed that the leads 912A, 912B of the capacitor 910 should be arranged in the order of the negative polarity-positive polarity with respect to the movement direction. At this time, if the polarity of the capacitor 910 is detected as the positive polarity-negative polarity by the first polarity test unit 340, the rotation unit 350 rotates the capacitor 910 by 1800 and the second polarity test unit 360 confirms whether the capacitor 910 has the intended polarity arrangement. At this time, if the capacitor 910 is still detected as the positive polarity-negative polarity or it is impossible to determine the polarity, the corresponding capacitor 910 may be determined as an electrical defect and classified and processed as a defective product. Meanwhile, the first polarity test unit 340 of the first processing module 300 may be matched with the symmetrical first polarity test unit 440 and the symmetrical second polarity test unit 460, which correspond and are matched in the second processing module 400, and the respective symmetrical polarity test units 440, 460 may include electrodes 441, 442, 461, 462 at positions opposite to the polarity test units 340, 360.

Meanwhile, as described above, if the capacitor 910 is determined as having the electrical defect by testing the polarity of the capacitor 910 by matching the second polarity test unit 360 with the symmetrical second polarity test unit 460, the capacitor 910 may be removed in a defect removal region (A) of the first processing module 300 formed adjacent to each of the second polarity test unit 360 and the symmetrical second polarity test unit 460 and a defect removal region (B) of the second processing module 400 matched therewith, and cutting and bending processes to be described later may not be performed.

FIG. 6 is a schematic one side view of a cutting unit in the apparatus for processing the capacitor according to the present disclosure.

Referring to FIGS. 2, 3, and 6, after testing the electrode, the capacitor 910 may be moved toward the cutting unit 370 by the clamping unit 200 to cut the leads 912A, 912B at the same length. The cutting unit 370 cuts the leads 912A, 912B of the capacitor 910 at the same length, and the lengths of the leads 912A, 912B after being cut may be cut to have a length stably bonded to the electrodes 922, 923 of the bracket 920 as shown in FIG. 1.

Referring to FIG. 6, the cutting unit 370 may include a first cutting step part 371 fixing the leads 912A, 912B of the capacitor 910, and a second cutting step part 372 vertically extending from the longitudinal direction of the first cutting step part 371, and include a cutting block 373 formed to protrude from the second cutting step part 372 and having a cut surface (C) formed to be inclined to cut the leads 912A, 912B. In the cutting block 373, an uppermost end of the cut surface (C), that is, a height of a surface where the cutting block 373 and the first cutting step part 371 are in contact with each other may have the second height (h2), and the second height (h2) at this time may be formed to be higher than the first height (h1) of the expansion block 431 of the expansion unit 330. The separation of the leads 912A, 912B by the expansion unit 330 is to smoothly test the polarity of the leads 912A, 912B, and the interval between the leads 912A, 912B may be minimized again with respect to the capacitor 910 whose polarity test is completed so that the interval at which the leads 912A, 912B may be smoothly bonded to the electrodes 922, 923 of the bracket 920 is formed.

Meanwhile, the second processing module 400 may be formed with a symmetrical cutting unit 470 formed to be correspondingly matched with the cutting unit 370 of the first processing module 300, and cutting the leads 912A, 912B of the capacitor 910. The symmetrical cutting unit 470 may include a symmetrical first cutting step part 471 corresponding to the first cutting step part 371 and a symmetrical second cutting step part 472 extending in the direction perpendicular to the longitudinal direction of the symmetrical first cutting step part 471. At this time, the first cutting step part 371 and the symmetrical first cutting step part 471 are matched with each other to fix the leads 912A, 912B not to be moved, and the cutting block 373 may stably cut the leads 912A, 912B. In order for the cutting block 373 to completely cut the leads 912A, 912B at the second height (h2), the cutting block 373 may allow the cutting unit 370 and the symmetrical cutting unit 470 to be formed without a gap.

However, according to the aforementioned description and as shown in FIG. 6, the cutting block 373 has been described as the configuration of the cutting unit 370, but the present disclosure is not necessarily limited thereto, and any configuration for achieving the purpose of substantially cutting the leads 912A, 912B of the capacitor at the same length is also possible. For example, the cutting block 373 including the cut surface having the second height (h2) is not formed on the cutting unit 370 of the first processing module 300, but may also be formed on the symmetrical second cutting step part 472 of the symmetrical cutting unit 470 side of the second processing module 400 side. Alternatively, the cutting block 373 may also be formed as a first cutting block and a second cutting block to correspond to the cutting unit 370 and the symmetrical cutting unit 470.

Referring to FIGS. 2 and 3, the first processing module 300 in the apparatus for processing the capacitor 100 according to the present disclosure may further include a cutting test unit 380 configured to test the cut quality as to whether the leads 912A, 912B have been normally cut by the cutting unit 370. To be matched with the cutting test unit 380, the second processing module 400 may include a symmetrical cutting test unit 480. The cutting test unit 380 may include a light sensor part 381 configured to accommodate specific light to test the cut lengths of the leads 912A, 912B.

Hereinafter, a method for testing the cut lengths of the leads 912A, 912B of the cutting test unit 380 will be described. First, when the capacitor 910 is seated on the cutting test unit 380, it is formed in the symmetrical cutting test unit 480, and light is emitted from a light radiation part 481 formed at a position corresponding to the light sensor part 381. The light sensor part 381 accommodates the light generated from the light radiation part 481, and if the leads 912A, 912B are incompletely cut, the light is reflected to the surfaces of the leads 912A, 912B and does not reach the light sensor part 381, or may reach an unintended portion. The mechanical defect of the capacitor 910 may be detected by testing the cut lengths of the leads 912A, 912B according to the accommodation of the light. Therefore, there is an advantage in that the apparatus for processing the capacitor 100 according to the present disclosure detects the electrical defect in the aforementioned polarity test units 340, 360 and detects the mechanical defect in the cutting test unit 380, thereby detecting the defect of the capacitor 910 itself before the capacitor assembly 900 is assembled.

Meanwhile, differently from the aforementioned description, the light radiation part may be formed on the cutting test unit 380 side formed in the first processing module 300 and performed when light is emitted, and the light sensor part may formed on the symmetrical cutting test unit 480 side formed on the second processing module 400 matched with the first processing module 300 to detect whether there is the mechanical defect.

In addition, if the mechanical defect is detected by the cutting test unit 380, the capacitor may be collected in a separate loading region other than a collection tray by the transport unit 500 to be described later and may not be assembled to the capacitor assembly 900. It is possible to prevent the mechanically defective capacitors 910 collected in the separate loading region from being assembled to the capacitor assembly 900, thereby preventing the defective capacitor assembly 900 from being manufactured.

FIG. 7 is a schematic one side view of a bending unit in the apparatus for processing the capacitor according to the present disclosure.

Referring to FIGS. 2, 3, and 7, when the test of the capacitor 910 is completed by the cutting test unit 380 in the apparatus for processing the capacitor 100 according to the present disclosure, the capacitor 910 may include a bending unit 390 including a first step part 391 having a first thickness (d11) and a second step part 392 having a second thickness (d12) so that a pressurized force is applied to the leads 912A, 912B in the third direction perpendicular to both the first direction and the second direction to bend the cut leads 912A, 912B of the capacitor 910 in one direction.

The bending unit 390 serves to bend the leads 912A, 912B so that the leads 912A, 912B of the capacitor 910 are in contact with the electrodes 922, 923 formed on one surface of the bracket 920, and to achieve this role, the bending unit 390 is formed to have the step parts 391, 392 having different thicknesses (d11, d12). In addition, a bending part 393 connecting the first step part 391 to the second step part 392 may be formed between the first step part 391 and the second step part 392. The bending part 393 may be formed to connect the first step part 391 to the second step part 392 and to have a regular angle between the first step part 391 and the second step part 392, and this angle may be an acute angle. If the bending part 393 is formed at an angle equal to or larger than a right angle, the leads 912A, 912B is highly likely to be broken when being bent, so that the leads 912A, 912B are formed to have a smooth inclination to be stably bent.

At this time, a symmetrical bending unit 490 may be formed in the second processing module 400 to be matched with the bending unit 390. The symmetrical bending unit 490 may further include a symmetrical first step part 491 formed to correspond to the bending unit 390, having a third thickness (d21), and corresponding to the first step part 391, and a symmetrical second step part 492 having a fourth thickness (d22) and corresponding to the second step part 392, and further include a symmetrical bending part 493 connecting the symmetrical first step part 491 to the symmetrical second step part 492 and formed to have a certain angle. Meanwhile, intervals between the first step part 391 and the symmetrical first step part 491, between the second step part 392 and the symmetrical second step part 492, and between the bending part 393 and the symmetrical bending part 493 may be equally formed when the first processing module 300 and the second processing module 400 are matched with each other. In particular, the intervals therebetween at this time are preferably formed to correspond to diameters of the leads 912A, 912B of the capacitor 910.

For example, describing the configurations of the step parts 391, 392 and the symmetrical step parts 491, 492, the leads 912A, 912B of the capacitor 910 may be formed to have different thicknesses to be bent in the positive direction of x-axis. The first thickness (d11) of the first step part 391 may be smaller than the second thickness (d12) of the second step part 392. Since the first thickness (d11) is smaller than the second thickness (d12), the leads 912A, 912B may be bent from the first step part 391 toward the thickness direction of the second step part 392.

Meanwhile, to equally form the intervals between the first step part 391 and the symmetrical first step part 491, and between the second step part 392 and the symmetrical second step part 492, the first thickness (d11) of the first step part 391 may be smaller than the third thickness (d21) of the symmetrical first step part 491, and the second thickness (d12) of the second step part 392 may be larger than the fourth thickness (d22) of the symmetrical second step part 492. More specifically, the sum of the first thickness (d11) and the third thickness (d21) may be equal to the sum of the second thickness (d12) and the fourth thickness (d22). As described above, there is an advantage in that the bending unit 390 and the symmetrical bending unit 490 may be formed depending upon the thickness relationship of the step parts 391, 392, 491, 492, thereby equally bending the leads 912A, 912B.

In addition, the bending unit 390 may have one end of the bending part 393 connected to the first step part 391, the other end of the bending part 393 connected to the second step part 392, and one end of the bending part 393 formed at the third height (h3). At this time, the third height (h3) may be formed to be higher than the second height (h2) corresponding to the height of the cutting block 373 of the cutting unit 370. The third height (h3) may be formed to be higher than the second height (h2), thereby bending the leads 912A, 912B on the upper portions of the cut surfaces of the leads 912A, 912B.

Referring to FIG. 2, the capacitor 910 completely processed up to the bending process in the bending unit 390 may be formed on the distal end of the apparatus for processing the capacitor 100, and moved to the collection tray by the transport unit 500 collecting the capacitor processed by matching the first processing module 300 with the second processing module 400. The transport unit 500 may include a fixing part 510 supported to be fixed to one surface thereof, and a rotation part 520 coupled to one surface of the fixing part to rotate within the range of an angle of a straight angle (180°) or less on a virtual plane including the first direction and the second direction moving to transport the capacitor 910 of the clamping module 200. The rotation part 520 may further include a pair of transport arms 521, 522 that may move the capacitor 910 seated on the bending unit 390 of the first processing module 300 to a separate transport tray (not shown), and grab the main body 911 of the capacitor 910 at one point (i.e., the bending unit 390 of the first processing module 300) to release it at another point (separate transport tray) for this transport operation. At this time, since the capacitor determined as having the electrical defect has been previously removed in the defect removal region (A), only the high-quality processed capacitor 910 may be loaded on the transport tray.

Meanwhile, the capacitor 910 determined as having the mechanical defect by the cutting test unit 380 and the symmetrical cutting test unit 480 may be manually removed in the transport process, or prevented from being loaded in a separate loading region, which is formed to be spaced apart from the transport tray on which the high-quality capacitor is loaded by the control of the transport unit 500 to be assembled to the capacitor assembly 900.

Hereinafter, a method for processing a capacitor according to the present disclosure will be described. In the description of the method for processing the capacitor, the contents overlapping the description of the aforementioned apparatus for processing the capacitor will be briefly mentioned or omitted.

FIG. 8 is a flowchart of a method for processing a capacitor according to the present disclosure.

Referring to FIGS. 1 and 8, the method for processing the capacitor including a main body and a pair of leads formed to protrude from the main body according to the present disclosure may include cutting (S170) the leads of the capacitor at a certain length, and bending (S190) that bends the leads of the capacitor cut in the cutting in one direction.

In the cutting (S170), the leads 912A, 912B of the capacitor 910 may be cut at the same length, and are cut to have the lengths at which the leads 912A, 912B may be stably bonded to the electrodes 922, 923 of the bracket 920. The leads 912A, 912B may be cut in various methods, but preferably, may be cut to have the desired lengths by the cutting block 373 formed on at least one of the cutting unit 370 formed on the first processing module 300 and the symmetrical cutting unit 470 formed on the second processing module 400 in the aforementioned apparatus 100 for processing the capacitor.

Meanwhile, before the cutting of the leads 912A, 912B (S170) is performed, a series of processes for testing the electrical polarity of the capacitor 910 may be additionally performed.

The method for processing the capacitor according to the present disclosure may further include, before cutting the leads 912A, 912B of the capacitor 910, separating the leads (S120) that separates the leads 912A, 912B of the capacitor 910 at the first height (h1), testing the polarity (S130, S150) that detects the polarity of each of the separated leads 912A, 912B of the capacitor 910 after the separating of the leads (S120), testing the cutting (S180) that determines the cut lengths of the leads 912A, 912B depending upon whether reflected light according to the radiation of the light is introduced to test the cut quality of the leads 912A, 912B cut by performing the aforementioned cutting (S170) after the testing of the polarity (S130, S150), and determining a defective product (S160) that determines whether the capacitor 910 is defective and classifies the defective product from the testing of the polarity (S130, S150).

The separating of the leads (S120) may separate the leads 912A, 912B by the expansion unit 330 and the symmetrical expansion unit 430 in the aforementioned apparatus for processing the capacitor 100, and separate the leads 912A, 912B, thereby minimizing the electrical interference that may be caused in each of the leads 912A, 912B in the testing of the polarity of the capacitor 910 (3130, 3150). Meanwhile, if the capacitor 910 is not arranged in a desired direction depending upon the result of testing a first polarity (S130), the polarity of the capacitor 910 may be aligned by the rotation unit (not shown) formed on the clamping unit 220 of the clamping module 200. However, if it is still detected that the capacitor 910 is not arranged in the desired direction even in testing a second polarity (S150), the corresponding capacitor 910 may be determined as having the electrical defect and removed by the determining of the defective product (S160) to be described later.

Meanwhile, for the separation of the leads 912A, 912B and the smooth testing of the polarity of the capacitor 910 (S130, S150), aligning at least one lead (S110, S140) that aligns the positions of the leads at the correct positions may be included. Aligning a first lead (S110) may rotate and align the main body 911 of the capacitor 910 if the capacitor 910 is seated on the alignment unit 320 having the alignment groove 321 formed in the first processing module 300 and the leads 912A, 912B of the capacitor 910 are not normally seated in the alignment groove 321 in the aforementioned apparatus for processing the capacitor 100. In addition, in aligning a second lead (S140), if the polarity of the capacitor 910 is opposite, the rotation unit may align the polarity of the capacitor 910 by rotating the capacitor 910 by 1800 around the main body 911 of the capacitor 910. As shown in FIG. 8, each of the aligning of the lead (S110, S140) and the testing of the polarity (S130, S150) may include at least two steps, and the aligning of the lead (S110, S140) and the testing of the polarity (S130, S150) may be performed alternately.

The relationship between the separation, cutting, and bending of the leads 912A, 912B of the capacitor 910 will be described. The leads 912A, 912B of the capacitor 910 may be separated for convenience of testing the polarity of the capacitor 910. At this time, the height at which the leads 912A, 912B are separated may be the first height (h1) as described above. Meanwhile, the leads 912A, 912B are separated by the expansion block 431 in which the first width (w1) on the proximal end 432 is larger than the second width (w2) on the distal end 433, that is, the width gradually reduces from the proximal end 432 toward the distal end 433 not to strain the deformation of the leads 912A, 912B upon separation.

Meanwhile, when the testing of the polarity (S130, S150) is completed, the leads 912A, 912B of the capacitor 910 may be cut by the cutting block having the cut surface formed at the second height (h2) higher than the first height (h1) to have the length and interval at which the leads 912A, 912B are easily bonded to the electrodes 922, 923 of the bracket 920. In addition, in the bending (S190), since the remaining leads 912A, 912B other than the cut portion should be bent, the bending part 393 may be formed at the third height (h3) formed to be higher than the second height (h2) to bend the leads 912A, 912B in one direction.

A process of bending the leads 912A, 912B in the bending (S190) may be performed by the shapes corresponding to the bending unit 390 formed on the first processing module 300 of the aforementioned apparatus for processing the capacitor 100 and the symmetrical bending unit 490 formed to be matched with the first processing module 300 in the second processing module 400 thereof. More specifically, the bending unit 390 of the first processing module 300 for which the bending (S190) is performed may include the first step part 391 having the first thickness (d11), the second step part 392 having the second thickness (d12), and the bending part 393 connecting the first step part 391 to the second step part 392, and the symmetrical bending unit 490 of the second processing module 400 formed to be matched with the first processing module 300 may include the first step part 491 having the third thickness (d21), the symmetrical second step part 492 having the fourth thickness (d22), and the symmetrical bending part 493 connecting the symmetrical first step part 491 to the symmetrical second step part 492.

For example, to bend the leads 912A, 912B of the capacitor 910 in one direction, the first thickness (d11) of the first step part 391 may be smaller than the second thickness (d12) of the second step part 392. Therefore, the leads 912A, 912B may be bent in the direction of the second thickness (d12) of the second step part 392. In addition, the first thickness (d11) of the first step part 391 may be smaller than the third thickness (d21) of the symmetrical first step part 491, and the second thickness (d12) of the second step part 392 may be larger than the fourth thickness (d22) of the symmetrical second step part 492. This thickness relationship is to form the bending unit 390 and the symmetrical bending unit 490 at a regular interval when they are matched with each other, and they may be formed so that the sum of the first thickness (d11) and the third thickness (d21) are substantially equal to the sum of the second thickness (d12) and the fourth thickness (d22).

As described above, the bending part 393 and the symmetrical bending part 493 may connect the first step part 391 to the second step part 392, and connect the symmetrical first step part 491 to the symmetrical second step part 492, respectively, and may be formed to have regular angles, and the angles at this time may an acute angle to prevent the risk of breakage due to the excessive bending of the leads 912A, 912B in the bending process.

Meanwhile, the cutting (S170), the bending (S190), the separating of the leads (S120), the testing of the cutting (S180), and the determining of the defective product (S160) may be performed by moving the clamping module 200 grabbing or releasing the main body 911 of the capacitor 910 and matching the first processing module 300 including the processing units for which the corresponding steps are performed to perform the respective steps with the second processing module 400 including the symmetrical processing units matched with the processing units.

In addition, the processing may be seen as being sequentially performed by moving the capacitor 910 from the (N−1)th processing unit toward the Nth processing unit in time series from the viewpoint of the processing one capacitor 910, but from the viewpoint of the entire system, the entire process may be seen as being simultaneously performed by the plurality of processing units formed on one surface of the first processing module 300, and the second processing module 400 having the plurality of symmetrical processing units matched with these processing units. Therefore, according to the method for processing the capacitor according to the present disclosure, there is an advantage in that all steps may be simultaneously performed by matching the first processing module 300 with the second processing module 400, thereby simplifying the processing process and processing a large amount of capacitors.

Meanwhile, the capacitor 910 whose processing has been completed up to the bending (S190) is transported by the transport unit in the transporting (S200) to be loaded on the separately provided collection tray (not shown). Meanwhile, since the capacitor 910 already determined as having the electrical defect in the determining of the defective product (S160) is excluded from the object of the transporting (S200), only the electrically normal capacitor may be collected in the collection tray. The transporting (S200) may grab the main body 911 of the normal capacitor 910 at one point to release it at another point, and at this time, one point may be the bending unit 390 side for which the bending (S190) is performed, and another point may be the collection tray side on which the normal capacitor is loaded.

In addition, as described above in the apparatus for processing the capacitor, the electrically defective capacitor 910 detected from the testing of the first polarity (S130) and the testing of the second polarity (S150) may be discharged before the cutting of the lead (S170) is performed, and in the transporting (S200), the capacitor 910 detected as having the mechanical defect from the testing of the cutting (S180) may be loaded on the separate loading region formed to be spaced apart from the collection tray, thereby preventing the defective capacitor assembly 900 from being assembled.

FIG. 9 is a flowchart for explaining a method for determining and discharging a defective product according to the processing of the capacitor in the method for processing the capacitor according to the present disclosure.

The determining of the defective product (S160) that determines the defective capacitor will be described with reference to FIG. 9. First, the testing of the polarity (3130, 3150) confirms whether the electrical characteristics of the capacitor 910 are correct (S161). At this time, the result of testing the polarity to be substantially confirmed may be the result of the testing of the second polarity (S150) in which the test is performed again after performing the aligning of the leads 912A, 912B based on the testing of the first polarity (S130). If it is determined that the electrical defect has occurred from the result of the testing of the second polarity (S150), it may be determined that the corresponding capacitor 910 is defective and therefore, removed/discharged in the defect removal region (A) formed on one surface of the first processing module 300 and the symmetrical defect removal region (B) formed on one surface of the second processing module 400 (S163). At this time, there may be various methods for removing/discharging the capacitor 910 determined as having the defect in the defect removal region (A) and the symmetric defect removal region (B), but preferably, the defective capacitor 910 may be separately collected in a collection box (or loading region) separated from the aforementioned collection tray by dropping in a direction of gravity (e.g., negative direction of z-axis in FIG. 2) without being fixed when the clamping unit 220 seats the capacitor 910 in the defect removal region (A) and the symmetrical defect removal region (B).

Likewise, the testing of the cutting (S180) determines whether the cut lengths of the leads 912A, 912B are within the allowable range (S162). The determination of whether the cut lengths are within the allowable range may mean the mechanical defect determination depending upon the result of the light accommodation by the operation of the light radiation part 481 and the light sensor part 381 in the aforementioned apparatus for processing the capacitor 100. When it is determined that the capacitor 910 is determined as having the mechanical defect because the cut lengths of the leads 912A, 912B do not fall within the allowable range, as described above, the corresponding capacitor 910 may be determined as having the defect and removed/discharged (S163). At this time, in the process of removing/discharging the capacitor 910 determined as having the mechanical defect, as described above, the capacitor 910 is not loaded on the collection tray by the transport unit 500, but loaded in the separate loading region formed to be spaced apart from the collection tray not to be assembled to the capacitor assembly 900 in the transporting (S200).

As described above, it is possible to determine both electrical defect and the mechanical defect of the capacitor to remove/discharge the capacitor in advance before performing the transporting (S200), thereby preventing the product of the capacitor assembly 900 having the defective capacitor 910 from being assembled.

The aforementioned description is merely illustrative of the technical spirit of the present disclosure, and various modifications and changes will be possible by those skilled in the art to which the present disclosure pertains without departing from the essential characteristics of the present disclosure.

Therefore, the exemplary embodiments disclosed in the present disclosure are not intended to limit but to explain the technical spirit of the present disclosure, and the scope of the technical spirit of the present disclosure is not limited to these exemplary embodiments. The scope of the present disclosure should be interpreted by the following claims, and all technical spirits within the scope equivalent thereto should be interpreted as being included in the scope of the present disclosure.

INDUSTRIAL APPLICABILITY

The present disclosure provides the apparatus for processing the capacitor that grabs or releases the plurality of capacitors at the same time and performs different processing processes at the same time, and the method for processing the capacitor that processes the plurality of capacitors at the same time, processes the capacitor in the regular order and tests the capacitor.

The invention claimed is:

1. An apparatus for processing a capacitor comprising a main body and a pair of leads formed to protrude from the main body comprising:
  a clamping module transporting the capacitor and comprising clamping units grabbing or releasing each capacitor;
  a first processing module having some of the capacitors transported by the clamping module seated thereon; and
  a second processing module moved toward the first processing module in a state where some of the capacitors are seated on the first processing module and matched with the first processing module,
  wherein the first processing module comprises a plurality of processing units on which each capacitor is seated and arranged in order,
  wherein the second processing module comprises symmetrical processing units matched with the processing units, respectively, and
  wherein the processing units are formed in different shapes
  wherein any one of the clamping units seats the capacitor on any one of the processing units in a state of grabbing the capacitor, and then releases the capacitor when the processing unit and the symmetrical processing unit are matched, and moves toward the previous processing unit
  wherein the first processing module further comprises the N number of processing units,
  wherein the clamping module is
  (1) moved in a first direction when the clamping unit seats the capacitor on an Nth processing unit of the first processing module,
  (2) moved in a direction opposite to the first direction when the clamping unit releases the capacitor in a state where the processing unit and the symmetrical processing unit are matched, and then moved in a second direction perpendicular to the first direction, and therefore, the clamping units are moved toward an (N−1)th processing unit, and
  (3) when the clamping unit is moved in the first direction and then grabs the capacitor seated on the (N−1)th processing unit, the matching between the first processing module and the second processing module are released.

2. The apparatus for processing the capacitor of claim 1, wherein the clamping module is
  (4) moved in the direction opposite to the first direction in a state where the matching between the first processing module and the second processing module are released to remove the capacitor grabbed by the clamping unit from the (N−1)th processing unit, and then moves in the direction opposite to the second direction to move the capacitor toward the Nth processing unit.

3. An apparatus for processing a capacitor comprising a main body and a pair of leads formed to protrude from the main body comprising:
  a clamping module transporting the capacitor and comprising clamping units grabbing or releasing each capacitor;
  a first processing module having some of the capacitors transported by the clamping module seated thereon; and
  a second processing module moved toward the first processing module in a state where some of the capacitors are seated on the first processing module and matched with the first processing module,
  wherein the first processing module comprises a plurality of processing units on which each capacitor is seated and arranged in order,
  wherein the second processing module comprises symmetrical processing units matched with the processing units, respectively, and
  wherein the processing units are formed in different shapes
  wherein the processing unit comprises
  an alignment unit rotating the capacitor in one direction and having an alignment groove for seating the pair of leads of the capacitor in the processing unit formed therein;
  an expansion unit comprising a pair of frames formed symmetrically to mold the leads of the capacitor in a regular form;
  a polarity test unit detecting the polarity of one of the pair of leads of the aligned capacitor;
  a cutting unit cutting the pair of leads of the capacitor at a same length;
  a cutting test unit testing the cut quality of one of the pair of leads cut by the cutting unit; and
  a bending unit comprising a first step part having a first thickness and a second step part having a second thickness formed to pressurize the cut pair of leads of the capacitor in a third direction perpendicular to the first direction and the second direction to bend the cut pair of leads of the capacitor in one direction.

4. The apparatus for processing the capacitor of claim 3, wherein the symmetrical processing unit comprises
  a symmetrical expansion unit formed to be matched with the expansion unit, inserted between the pair of leads to separate the pair of leads of the capacitor, and comprising an expansion block having a first height;
  a symmetrical cutting unit formed to be matched with the cutting unit and cutting the pair of leads of the capacitor; and
  a symmetrical bending unit formed to be matched with the bending unit and comprising a symmetrical first step part having a third thickness to correspond to the first step part and a symmetrical second step part having a fourth thickness to correspond to the second step part.

5. The apparatus for processing the capacitor of claim 4, wherein the expansion block has a shape whose width is reduced in the third direction.

6. The apparatus for processing the capacitor of claim 4, wherein at least one of the cutting unit and the symmetrical cutting unit comprises a cutting block having a cut surface formed to be inclined to cut the pair of leads of the capacitor and having a second height, and the cutting block is formed without a gap with the cutting unit and the symmetrical cutting unit.

7. The apparatus for processing the capacitor of claim 6, wherein the second height is formed to be higher than the first height.

8. The apparatus for processing the capacitor of claim 4, wherein the bending unit further comprises
a bending part connecting the first step part with the second step part between the first step part and the second step part,
wherein the symmetrical bending unit further comprises
a symmetrical bending part connecting the symmetrical first step part with the symmetrical second step part between the symmetrical first step part and the symmetrical second step part, and
wherein the first processing module and the second processing module are matched so that intervals between the first step part and the symmetrical first step part, between the second step part and the symmetrical second step part, and between the bending part and the symmetrical bending part are equally formed.

9. The apparatus for processing the capacitor of claim 8, wherein at least one of the cutting unit and the symmetrical cutting unit comprises a cutting block having the cut surface formed to be inclined to cut the pair of leads of the capacitor and having a second height, and
wherein the bending unit has one end of the bending part connected to the first step part, the one end of the bending part formed at a third height of the bending unit, and the third height is formed to be higher than the second height.

10. The apparatus for processing the capacitor of claim 8, wherein the first thickness of the first step part is smaller than the third thickness of the symmetrical first step part, the second thickness of the second step part is larger than the fourth thickness of the symmetrical second step part, and the first thickness of the first step part is smaller than the second thickness of the second step part.

11. The apparatus for processing the capacitor of claim 3, wherein the cutting test unit comprises a light sensor part configured to accommodate specific light to test a cut length of one of the pair of leads.

12. An apparatus for processing a capacitor comprising a main body and a pair of leads formed to protrude from the main body comprising:
a clamping module transporting the capacitor and comprising clamping units grabbing or releasing each capacitor;
a first processing module having some of the capacitors transported by the clamping module seated thereon; and
a second processing module moved toward the first processing module in the state where some of the capacitors are seated on the first processing module and matched with the first processing module,
wherein the first processing module comprises a plurality of processing units on which each capacitor is seated and arranged in order,
wherein the second processing module comprises symmetrical processing units matched with the processing units, respectively, and
wherein the processing units are formed in different shapes
a transport unit configured to collect the capacitor processed by matching the first processing module with the second processing module,
wherein the transport unit comprises
a fixing part supported to be fixed to one surface thereof; and
a rotation part coupled to one surface of the fixing part and rotating within an angle range of a straight angle or less on a plane comprising a first direction in which the clamping module moves to transport the capacitor and a second direction perpendicular to the first direction, and
wherein the rotation part further comprises a pair of transport arms grabbing the main body of the capacitor at one point to release the capacitor at another point.

\* \* \* \* \*